United States Patent
Hoslett

[19]

[11] Patent Number: 5,984,275
[45] Date of Patent: Nov. 16, 1999

[54] TRUCK CAP HOISTING SYSTEM

[76] Inventor: Glenn J. Hoslett, 2119 Yvonne St., Waukesha, Wis. 53188

[21] Appl. No.: 09/140,384

[22] Filed: Aug. 26, 1998

[51] Int. Cl.[6] .................................................. B66D 1/36
[52] U.S. Cl. ........................ 254/338; 248/327; 414/626; 294/74
[58] Field of Search .................................. 254/269, 334, 254/335, 336, 338, 343, 217, 218; 248/327, 323; 150/166, 168; 383/22, 97, 67; 296/136; 160/370.2; 414/626; 294/74; 410/103

[56] References Cited

U.S. PATENT DOCUMENTS

| | | | |
|---|---|---|---|
| 192,415 | 6/1877 | Castleman. | |
| 433,002 | 7/1890 | Hensley. | |
| 973,572 | 10/1910 | Sims | 254/338 |
| 2,738,204 | 3/1956 | Ibey | 410/103 |
| 2,946,563 | 7/1960 | Eaton | 410/103 |
| 3,934,919 | 1/1976 | Smith | 294/74 |
| 4,066,287 | 1/1978 | Rowley | 294/74 |
| 4,113,146 | 9/1978 | Williamson | 383/67 X |
| 4,362,292 | 12/1982 | Rowan et al. | 254/336 |
| 4,600,177 | 7/1986 | Fritz | 254/338 |
| 4,830,427 | 5/1989 | Fiocchi | 296/136 |
| 5,240,305 | 8/1993 | Trethewey | 296/136 |
| 5,263,687 | 11/1993 | Garbiso | 254/334 |
| 5,282,706 | 2/1994 | Anthoney et al. | 254/218 X |
| 5,320,394 | 6/1994 | Urbank | 294/74 |
| 5,897,104 | 4/1999 | Garbiso | 254/334 |

*Primary Examiner*—Donald P. Walsh
*Assistant Examiner*—Emmanuel M. Marcelo
*Attorney, Agent, or Firm*—Donald J. Ersler

[57] ABSTRACT

A truck cap hoisting system includes a winch, at least one pulley, a pair of support channels, a pair of lifting strap assemblies, and a lifting line. The truck cap lifting system is preferably installed in a garage. The winch and a guide pulley are attached to a wall of the garage. The lift pulley is attached to a ceiling or an overhead beam. The lifting line is fastened to a lift ring and a reel of the winch. Each lifting strap assembly is threaded through one end of the pair of support channels. The truck cap is hoisted off the pick-up truck by first placing spacers between the truck and truck cap and sliding support channels in the gap. The same procedure is repeated for the opposite side. Four S-hooks extending from the pair of lifting assemblies are attached to the lift ring. The winch is then rotated until the truck cap is hoisted to a suitable height. The pair of support channels could be eliminated by forming at least four slots in the bottom of the truck cap sides. The lifting strap assemblies would be threaded through the slots in the bottom of the truck cap sides. Support lines may be attached to the sides of the truck cap instead utilizing strap assemblies and slots. The truck cap hoisting system may be modified to accommodate the removal of a water craft from the top of a vehicle by attaching support bars to each end of the support channels.

38 Claims, 7 Drawing Sheets

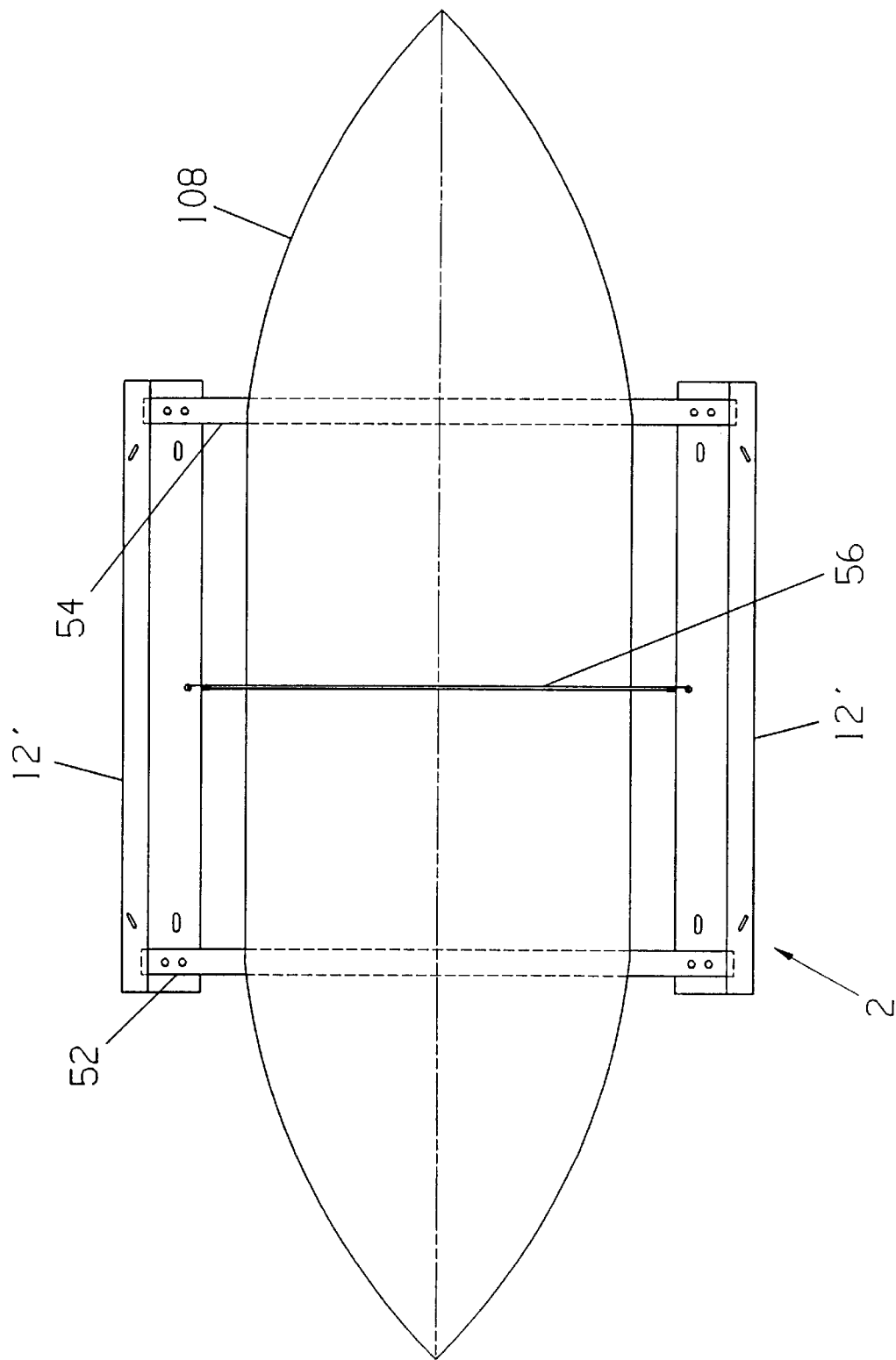

TRUCK CAP HOISTING SYSTEM

BACKGROUND OF THE INVENTION

1. Field of the Invention

The present invention relates generally to hoisting devices and more specifically to a truck cap hoisting system which allows a single person to lift a truck cap off a pick-up truck and store thereof above the pick-up truck.

2. Discussion of the Prior Art

A problem frequently encountered with pick-up trucks is how to remove a truck cap and store thereof. It takes at least two persons to remove a truck cap from a pick-up truck, because of the truck cap weight and awkwardness. Moreover, most people do not have sufficient space in a garage or elsewhere to store a truck cap.

Accordingly, there is a clearly felt need in the art for a truck cap lift system which allows a single user to remove a truck cap and have a place to store thereof after removal.

SUMMARY OF THE INVENTION

The primary objective of the present invention is to provide a truck cap lift system which allows a single user to remove a truck cap and have a place to store thereof after removal.

According to the present invention, a truck cap lift system includes a winch, at least one pulley, a pair of support channels a pair of lifting strap assemblies, and a lifting line. The truck cap lifting system is preferably installed in a garage. The winch is attached to a stud or support structure on the wall of a garage. A guide pulley is preferably attached to the stud or support structure above the winch. A lift pulley is attached to an overhead beam or stud in line with the winch. One end of the lifting line is fastened to a lift ring and the other end to a reel of the winch. Each lifting strap assembly includes a lifting strap, a ratchet tensioner, and a tensioning strap. One end of the lifting strap is terminated by an S-hook and the other end is fastened to the ratchet tensioner. One end of the tensioning strap is terminated by an S-hook and the other end is retained by a ratchet reel of the ratchet tensioner. The pair of lifting strap assemblies could be replaced with a pair of lifting straps which have S-hooks on each end. The pair of lifting straps could have special lengths for each size truck cap or be made one length to fit most truck caps. The disadvantage to a non-adjustable pair of lifting straps is the inability to lift a cap which has differing heights.

Each support channel is preferably fabricated from an angle structure. The support channel has a bottom leg and a side leg. The bottom leg has a lengthwise slot at each end which is sized to loosely receive the pair of lifting straps. The side leg preferably has an angled slot at each end which is preferably disposed above the lengthwise slot. The angled slot is sized to loosely receive the pair of lifting straps. After each lifting strap is threaded through the slots in the pair of support channels, each lifting strap is attached to the ratchet tensioner The truck cap is hoisted off the pick-up truck in the following manner. The truck cap is unfastened from the pick-up truck. Next, the truck cap is lifted up at the front and a spacer is placed under a bottom edge. The truck cap is then lifted up at the rear, on the same side while sliding one of the support channels into the gap between the truck cap bottom edge and the truck. A second spacer is also placed between the truck cap bottom edge and the truck. The same procedure is followed for the other side of the truck cap. Preferably, a compression stabilizer bar is placed inside the cap at substantially a rear thereof. A hole is also formed in the bottom of the support channel at substantially each end thereof. A tensioning device is used to keep the compression stabilizer bar in place. The compression stabilizer bar protects the truck cap from damage at the rear which may be caused by compression during lifting. The four S-hooks extending from the pair of lifting strap assemblies are attached to the lift ring. The winch is then rotated until the truck cap is hoisted to a suitable height.

The pair of support channels could be eliminated if at least four slots were formed in the bottom of the truck cap sides. The pair of lifting straps would be threaded through the slots in the truck cap similar to the slots in the support channels. The slots would be disposed in the truck cap such that the pair of strap assemblies would lift the truck cap at its center of gravity.

The slots in the truck cap may be replaced with a projection A cable or strap with a ring on one end and a S-hook on the other end could be used to lift the truck cap. An extension stabilizer bar would have to be attached to the truck cap to prevent damage during lifting.

The truck cap hoisting system may be modified to accommodate the removal of a canoe, boat, or other water craft from the top of a vehicle. A first support bar would be attached to a first end of each support channel and a second support bar would be attached to a second end of each support channel. The pair of support channels, first support bar and second support bar form a rigid frame. The rigid frame is slipped under the water craft. The winch is then rotated until the water craft is raised to the desired height. The compression stabilizer bar and the bungie cord are not used for the modified truck cap hoisting system.

Accordingly, it is an object of the present invention to provide a truck cap hoisting system which allows a single operator to lift a truck cap off a pick-up.

It is a further object of the present invention to provide a truck cap hoisting system which allows a truck cap to be stored in a convenient fashion.

It is yet a further object of the present invention to provide a truck cap hoisting system which allows a manufacturer of truck caps to modify their product to be easily lifted off a pick-up truck.

It is yet a further object of the present invention to provide a truck cap hoisting system which may be modified to easily hoist a water craft off a vehicle.

Finally, it is another object of the present invention to provide a truck cap hoisting system which may be modified to easily store a water craft in a garage.

These and additional objects, advantages, features and benefits of the present invention will become apparent from the following specification.

BRIEF DESCRIPTION OF THE DRAWINGS

FIG. 7 is a top view of a pair of support channels which have been modified to accommodate lifting a water craft in accordant with the present invention.

DETAILED DESCRIPTION OF THE PREFERRED EMBODIMENTS

Figure 1:
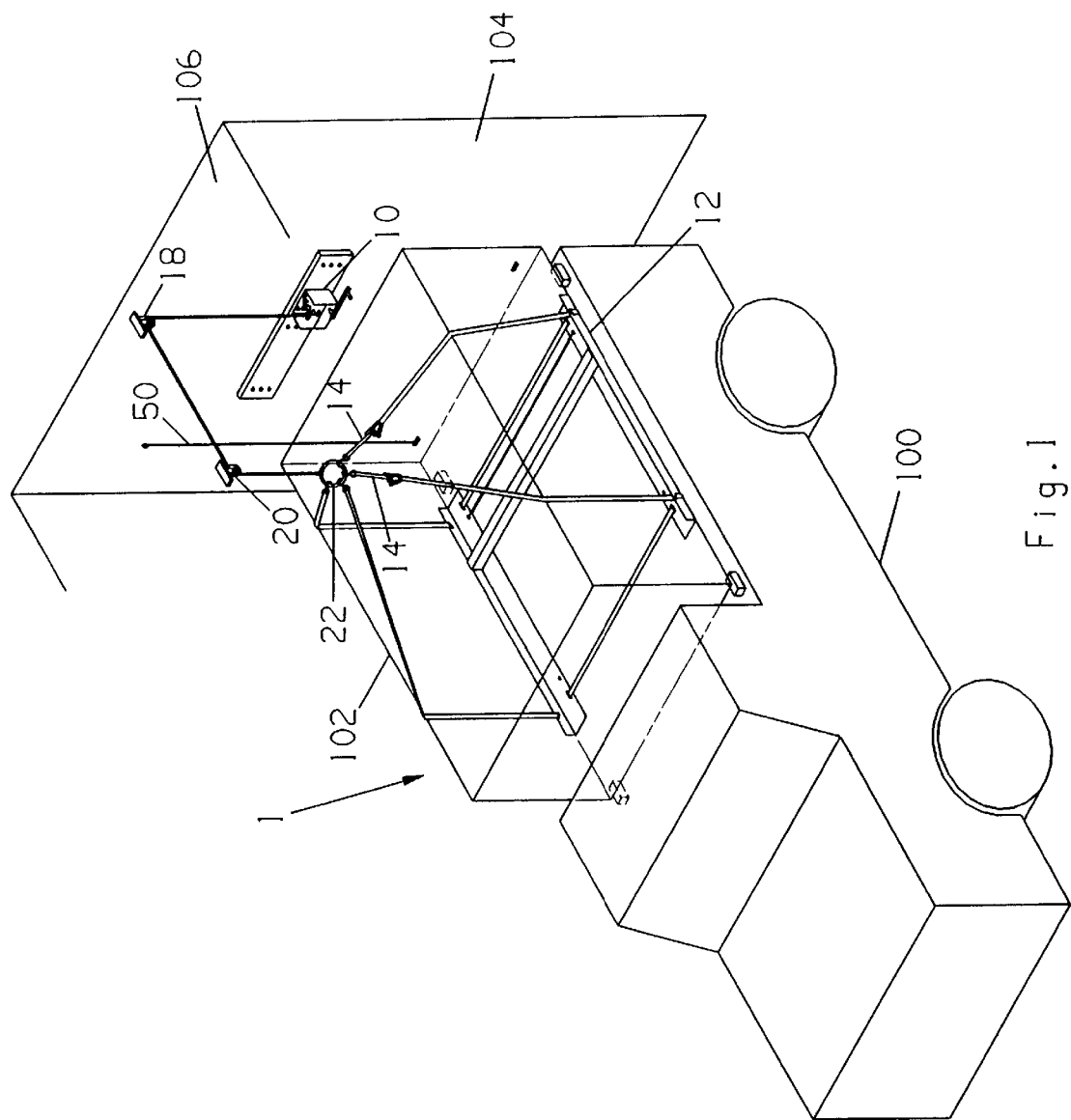
FIG. 1 is a perspective view of a truck cap being hoisted off a pick-up truck with a truck cap hoisting device in accordance with the present invention.
Figure 2:
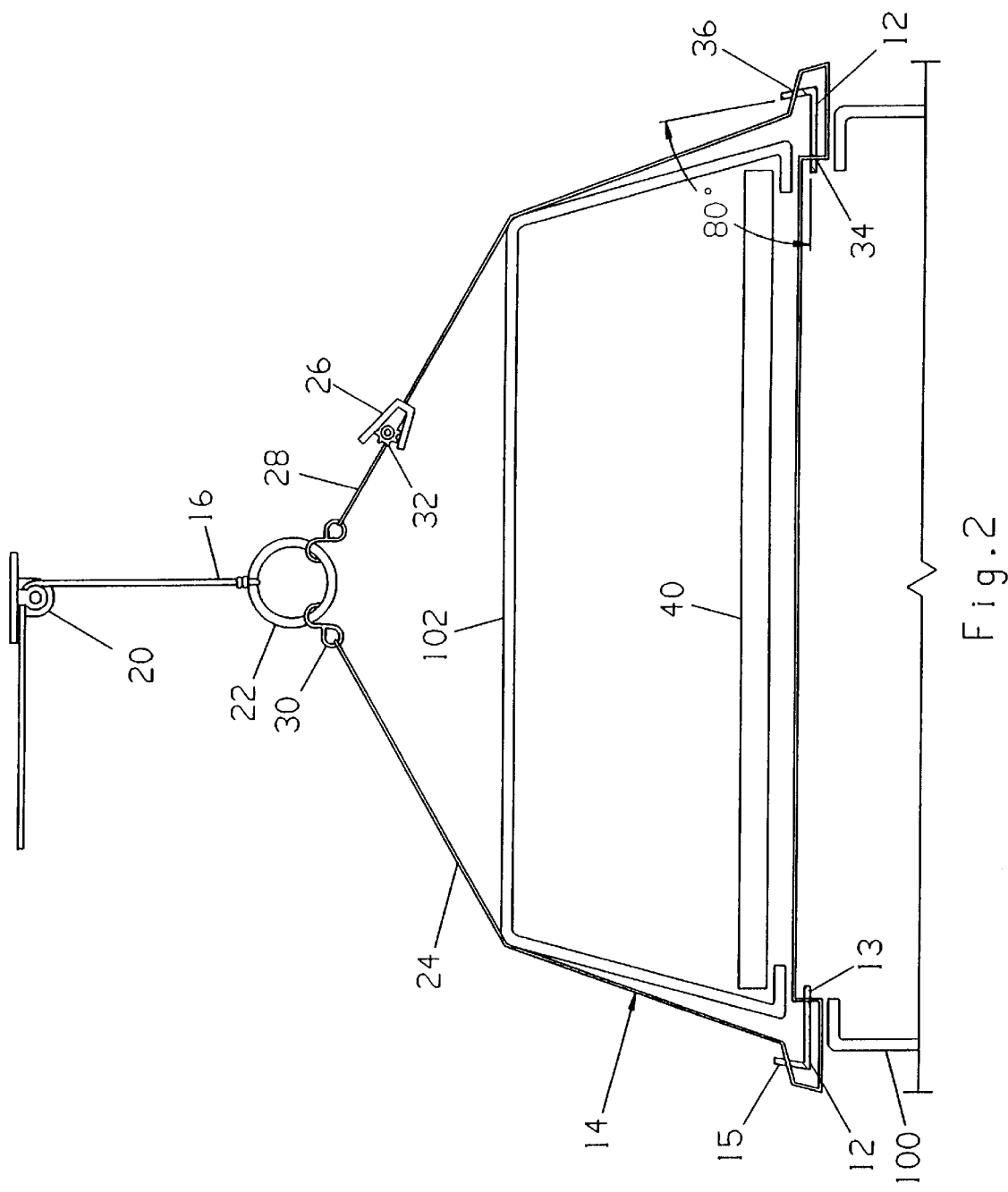
FIG. 2 is a rear view of a truck cap being hoisted off a pick-up truck with a truck cap hoisting device in accordance with the present invention.
Figure 3:
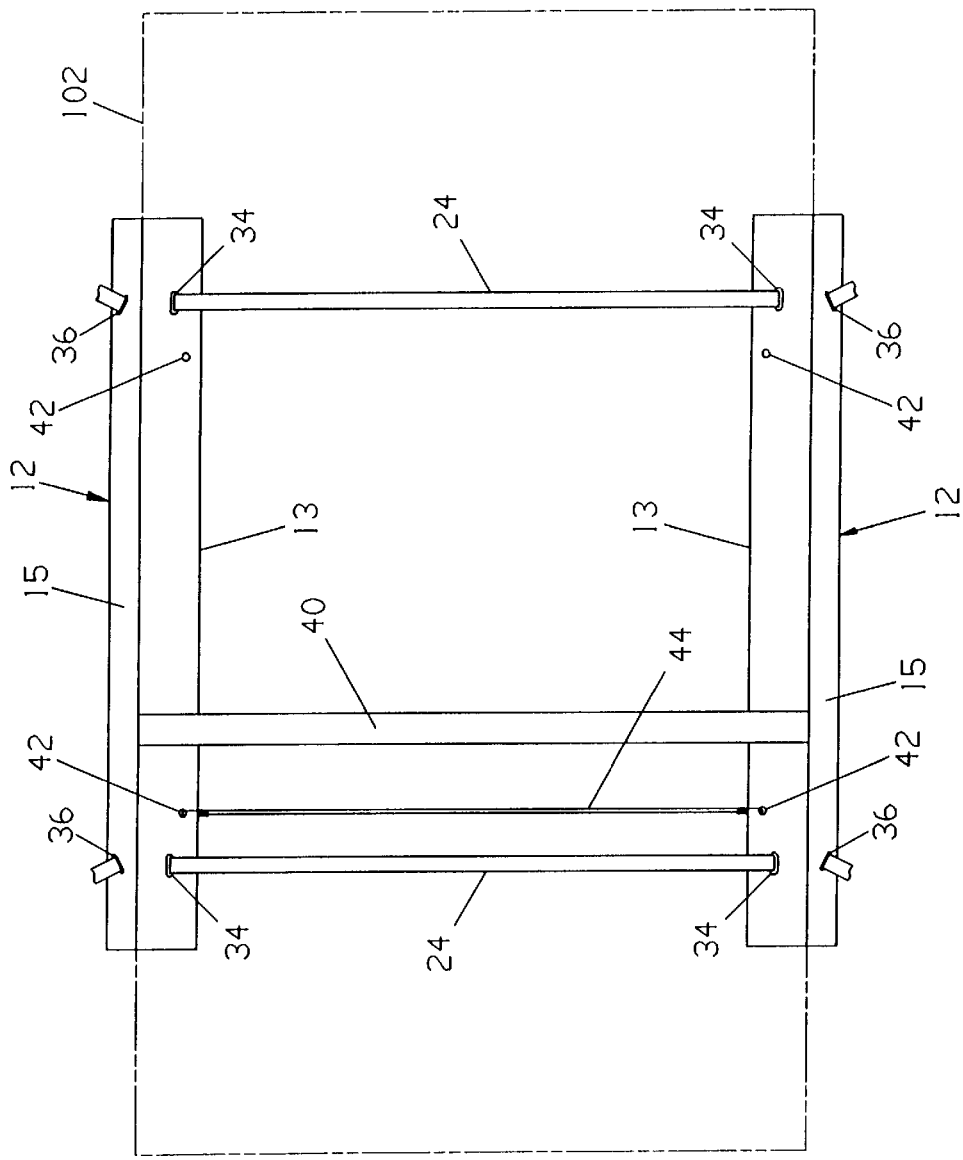
FIG. 3 is a top view of a pair of channel supports providing support for a truck cap in accordance with the present invention.
Figure 4:
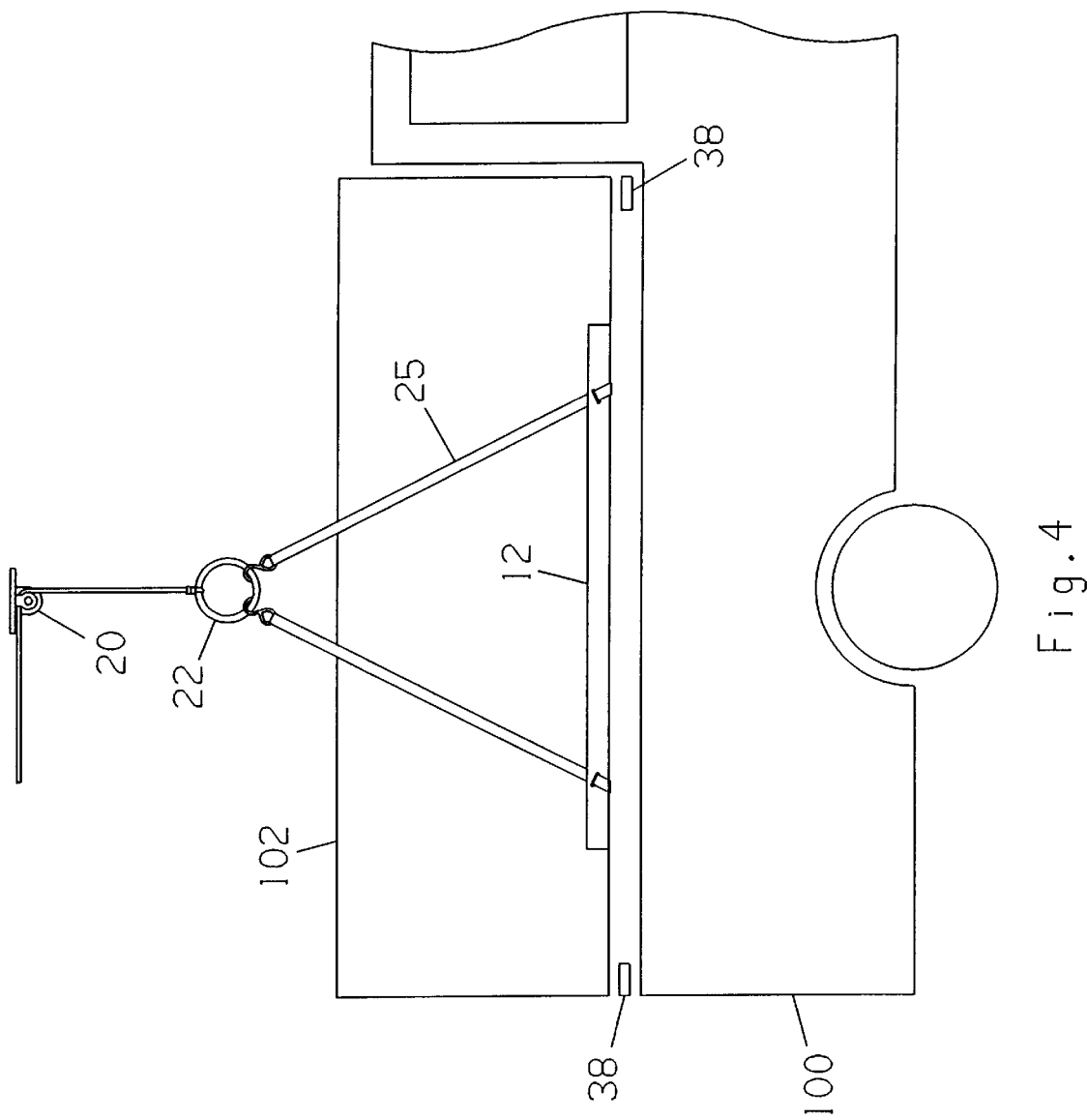
FIG. 4 is a side view of a truck cap, and a pair of spacers disposed on the truck in accordance with the present invention.

With reference now to the drawings, and particularly to FIG. 1, there is shown a perspective view of a truck cap hoisting system 1. With reference to FIGS. 2–4, the truck cap hoisting system 1 includes a winch 10, at least one pulley, a pair of support channels 12, a pair of lifting strap assemblies 14, and a lifting line 16. FIG. 2 shows separation between some items for the sake of clarity. The truck cap lifting system 1 is preferably installed in a garage. The winch 10 is attached to a stud or support structure on the wall 102 of a garage. A guide pulley 18 is preferably attached to the stud or support structure above the winch 10. A lift pulley 20 is attached to an overhead beam or stud on the ceiling 106 of the garage in line with the winch 10. The lifting line 16 is fastened to a lift ring 22 and a reel of the winch 10. The lifting line 16 is preferably fabricated from a rope or cable preferably having a rating of at least 300 pounds. Each lifting strap assembly 14 includes a lifting strap 24, a ratchet tensioner 26, and a tensioning strap 28. One end of the lifting strap is terminated by an S-hook 30 and the other end is fastened to the ratchet tensioner 26. One end of the tensioning strap 28 is terminated by an S-hook 30 and the other end is retained by a ratchet reel 32 of the ratchet tensioner 26. A lifting strap assembly 14 which provides satisfactory performance may be purchased from USA Products of California. Lifting straps manufactured from other companies may also be used.

With reference to FIG. 4, pair of lifting strap assemblies 14 could be replaced with a pair of lifting straps 25 which have S-hooks on each end. The pair of lifting straps 25 could have special lengths for each size truck cap, made one length to fit most truck caps, or made to a small number of lengths to fit different size truck caps. One disadvantage to a non-adjustable pair of lifting straps 24 is the inability to hoist a truck cap which has different heights.

Each support channel 12 is preferably fabricated from an angle structure. The support channel 12 has a bottom leg 13 and a side leg 15, the legs preferably have an included angle of 80 degrees. The 80 degree angle forces the strap to contact each side of the truck cap 102. The bottom leg 13 has a lengthwise slot 34 at each end which is sized to loosely receive the pair of lifting straps 24. The side leg 13 preferably has an angled slot 36 at each end which is preferably disposed above the lengthwise slot 34. The angled slot is sized to loosely receive the pair of lifting straps 24. After each lifting strap 24 is threaded through the slots in the pair of support channels 12, each lifting strap 24 is attached to a ratchet tensioner 26. The other end of each ratchet tensioner 26 has a tensioning strap 28 extending therefrom. The distance between the slots is preferably at least 2½ feet. If no ratchet tensioner 26 is used each end of the lifting strap 24 is threaded through the support channels 12 and then attached to S-hooks 30.

The truck cap 102 is hoisted off the pick-up truck 100 in the following manner. The truck cap 102 is unfastened from the pick-up truck 100. Next, the truck cap 102 is lifted up by hand at the front and a spacer 38 is placed under a bottom edge of the truck cap 102. The truck cap 102 is then lifted up by hand at the rear, on the same side while sliding one of the support channels 12 into the gap between the bottom edge of the truck cap 102 and the truck 100. A second spacer 38 is also placed between the bottom edge of the truck cap 102 and the truck 100. The same procedure is followed for the other side of the truck cap 102.

Preferably, a compression stabilizer bar 40 is placed inside the truck cap 102 at substantially a rear thereof. A hole 42 is also formed in the bottom leg 13 of the support channel 12 at substantially each end thereof. A tensioning device 44 is inserted into the holes 42. The tensioning device 44 is used to prevent the compression stabilizer bar 40 from falling out of the truck cap 102. The tensioning device 44 is preferably a bungie cord, but could be other devices. The compression stabilizer bar 40 protects the truck cap 102 from damage which would be caused by the lifting strap 24 squeezing or compressing the unsupported rear of the truck cap 102 during lifting.

The four S-hooks 30 extending from the pair of lifting straps 24 are attached to the lift ring 22. The pair of support channels 12 should be centered such that the truck cap 102 does not tilt to one side during hoisting. The pick-up truck 100 should be moved to facilitate the centering of the lifting line 16 relative to the truck cap 102. The ratchet tensioners 26 are tightened such that there is no slack in the lifting straps 24. The winch 10 is then rotated until the truck cap 102 is lifted to a suitable height.

Figure 5:
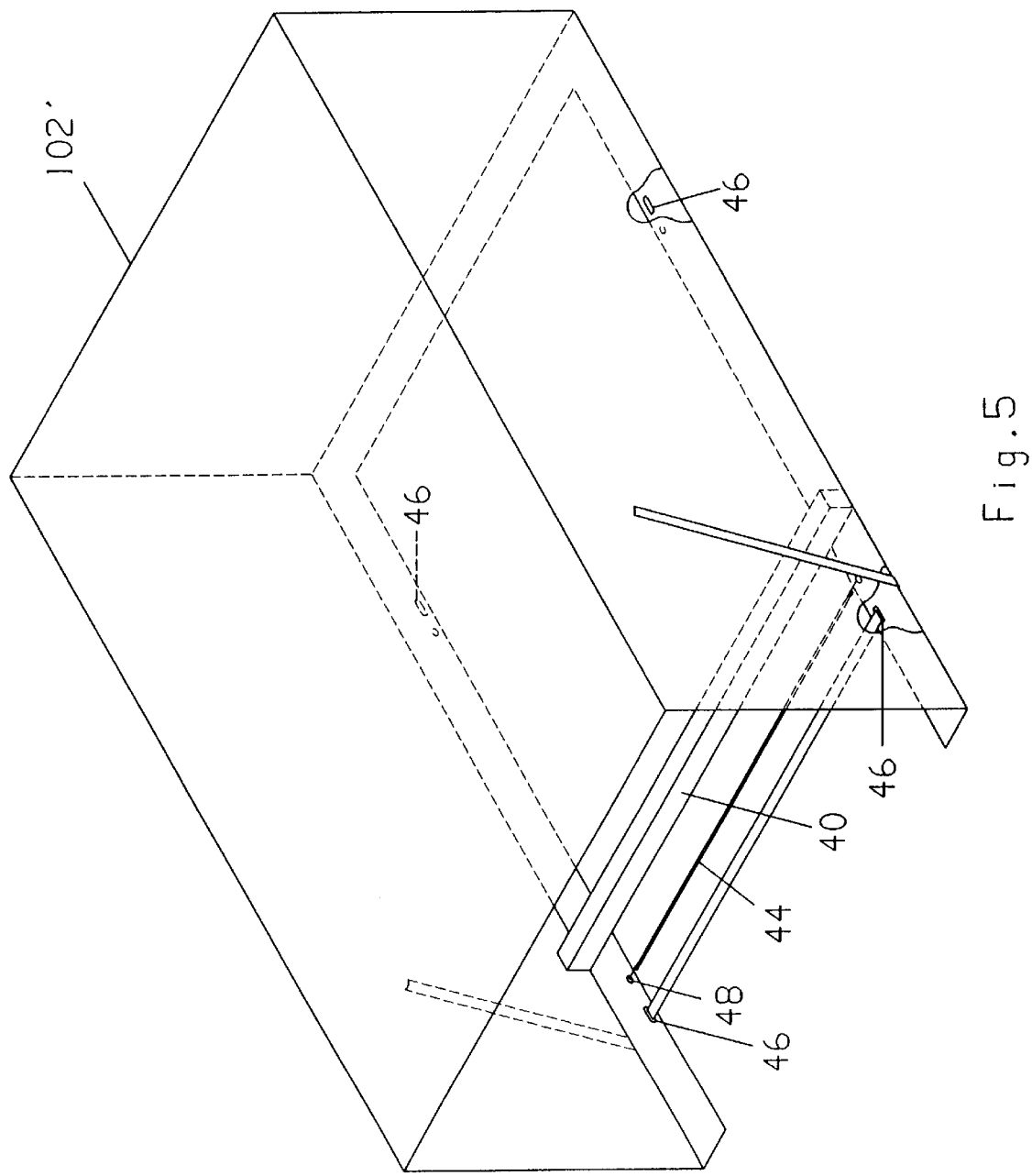
FIG. 5 is a perspective view of a truck cap which has been modified to include slots for receiving lifting straps in accordance with the present invention.

An optional stabilizer cord 50 may be used to prevent the truck cap 102 from rotating about the lifting line 16. One end of the stabilizer cord 50 is attached to a projection on the front or rear of the truck cap 102; the other end of the stabilizer cord 50 is attached to the ceiling 106 or a wall 104. The stabilizer cord 50 makes it easier to load the truck cap 102 back on to the pick-up truck 100. With reference to FIG. 5, the pair of support channels 12 could be eliminated if at least four slots 46 were formed on the bottom edges of the truck cap 102. The pair of lifting straps 24 would be threaded through the slots 46 as they would through the slots in the support channels 12. The slots 46 should be disposed in the bottom edges of the truck cap 102 such that the lifting straps 24 would hoist the truck cap 102 at its center of gravity. The distance between the slots would preferably be at least 2½ feet. A pair of tensioning holes 48 are also necessary for attachment of the tensioning device 44. The compression stabilizer bar 40 is still needed to prevent the lifting straps 24 from damaging the truck cap 102' by compression.

Figure 6:
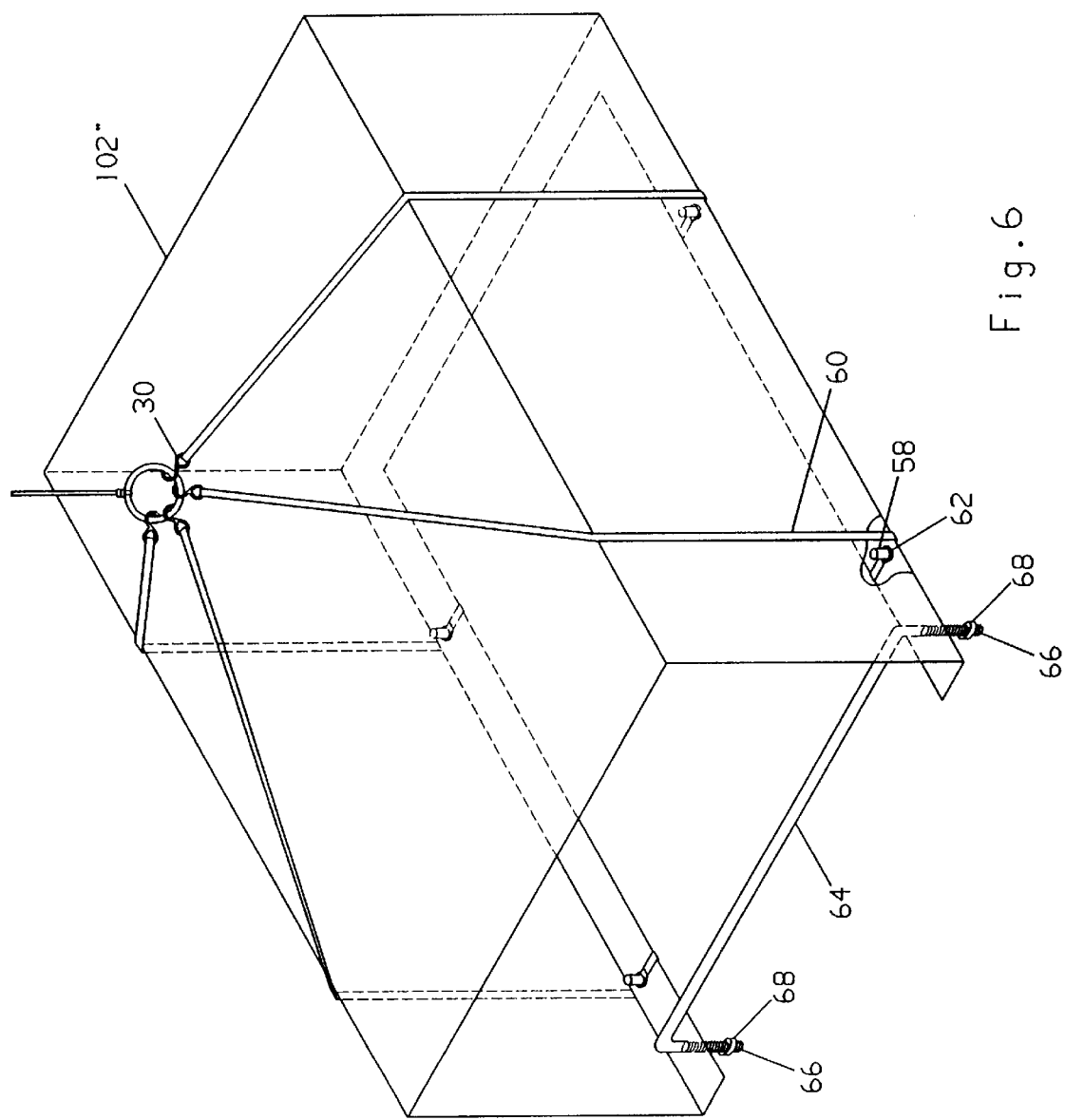
FIG. 6 is a perspective view of a truck cap which has beer modified with upstanding projections for receiving lifting straps in accordance with the present invention.

FIG. 6 shows that the preformed slot 46 in the truck cap 102" may be replaced with a projection 58. A support line 60 which may be a cable or strap with a ring 62 on one end and an S-hook 30 on the other could be used to lift the truck cap. An extension stabilizer bar 64 needs to be attached to the truck cap bottom edges to prevent damage from the sides being stretched apart during hoisting. Holes are formed in the bottom edges of the truck cap 102" to receive threaded ends 66 of the extension stabilizer bar 64. A nut 68 may be threaded onto the threaded ends 66 to prevent the extension stabilizer bar 64 from coming out of the holes during hoisting of the truck cap 102". The extension stabilizer bar 64 should not be limited to the design shown, but could include any design which prevents the sides of the truck cap 102" from spread and is easily fastenable to the truck cap 102". The extension stabilizer bar 64 could serve as a replacement for the compression stabilizer bar 40 and tensioning device 44.

The projection 58 and ring 62 attachment combination is not the only way in which a support line 60 may be attached to the truck cap 102". The following are only some examples, but not every alternate means of attaching the support line 60 to the bottom edges, sides, or top of the truck cap 102". A plurality of plates may be fastened to the truck cap 102". A hole would be formed in each plate and the support line would have a hook which would be inserted into the hole. The plurality plates could be replaced with a U-shaped handle. The hook would be placed around the U-shaped handle. An eye bolt could be substituted for the U-shaped handle. The hook could be replaced with a snap clip. The hook could be mounted to the truck cap and a U-shaped handle to the support line. The support line 60 could be made adjustable by adding a ratchet tensioner. Only three support lines 60 are needed if the support lines 60 are attached to the top of the truck cap 102".

FIG. 7 shows that the truck cap hoisting system 1 may be modified to accommodate the removal of a canoe, boat, or other water craft 108 from the top of a vehicle. A first support bar 52 is attached to a first end of each support channel 12' and a second support bar 54 is attached to a second end of each support channel 12'. The support bars may be attached to the pair of support channels 12' utilizing any suitable fastening method such as nuts and bolts. The pair of support channels 12', first support bar 52 and second support bar 54 form a rigid structure. The support bars preferably do not rotate relative to the support channels 12. The modified truck cap hoisting system 2 is slipped under the water craft 108. The winch 10 is then turned until the water craft 108 is hoisted to the desired height. No stabilizer bars are not used for the modified truck cap hoisting system 2. Preferably, at least one tensioning strap 56 is used to retain the water craft 108 relative to the modified truck cap hoisting system 2. The tensioning strap 56 is preferably a bungie cord.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention. The truck cap hoisting system should not be limited to lifting truck caps off of pick-up trucks, but should include hoisting any object off of any vehicle, or lifting and storing any object.

I claim:

1. An object hoisting system comprising:
   at least two support channels, each said support channel having at least one slot disposed on each end thereof;
   at least two lifting strap assemblies, each said lifting strap assembly being threaded through a slot in one end of said support channel, each said lifting strap assembly having a lifting strap, a tensioning strap, and a ratchet tensioner, said tensioning strap being tightened with said ratchet tensioner such that there is no slack in said lifting strap;
   a lifting line being attached to ends of said pair of lifting strap assemblies; and
   said lifting line being attached to a winch, said winch being rotated to hoist said object.

2. The object hoisting system of claim 1, further comprising:
   said support channel having a bottom leg and a side leg, a lengthwise slot being disposed in each end of said bottom leg, an angled slot being disposed in each end of said side leg.

3. The object hoisting system of claim 1, further comprising:
   a stabilizer bar being inserted inside of a truck cap at substantially the rear thereof.

4. The object hoisting system of claim 3, further comprising:
   a tensioning device being fastened to each support channel adjacent said stabilizer bar, wherein said stabilizer bar preventing the truck cap from being damaged.

5. The object hoisting system of claim 1, further comprising:
   an S-hook being disposed at one end of each said lifting strap, an S-hook being disposed at one end of each said tensioning strap.

6. The object hoisting system of claim 5, further comprising:
   said plurality of S-hooks being retained by a lift ring, said lift ring being fastened to said lifting line.

7. The object hoisting system of claim 1, further comprising:
   a first support bar being attached to a first end of each said support channels, a second support bar being attached to a second end of each said support channels.

8. The object hoisting system of claim 1, further comprising:
   at least one pulley being utilized to support said lifting line.

9. The object hoisting system of claim 1, further comprising:
   a stabilizer cord being attached to a truck cap to prevent thereof from rotating about said lifting line.

10. A modified truck cap hoisting system comprising:
    a truck cap having at least two slots disposed in each side at the bottom edges thereof;
    at least two lifting straps, each said lifting strap being threaded through one of said at least two slots in one side of the truck cap, said lifting strap including a ratchet tensioner, said ratchet tensioner allowing slack to be removed from said lifting strap;
    a lifting line being attached to each end of said pair of lifting straps; and
    said lifting line being attached to a winch, said winch being rotated to lift the truck cap.

11. The modified truck cap hoisting system of claim 10, further comprising:
    a stabilizer bar being inserted into the truck cap at substantially a rear thereof.

12. The modified truck cap hoisting system of claim 10, further comprising:
    an S-hook being disposed at each end of said lifting strap, said plurality of S-hooks being retained by a lift ring, said lift ring being fastened to said lifting line.

13. The modified truck cap hoisting system of claim 10, further comprising:
    at least one pulley being utilized to support said lifting line.

14. The modified truck cap hoisting system of claim 10, further comprising:
    a stabilizer cord being attached to the truck cap to prevent thereof from rotating about said lifting line.

15. An object hoisting system comprising:
    at least two support channels, each said support channel having a bottom leg and a side leg, at least one lengthwise slot being disposed in each end of said bottom leg, an angled slot being disposed in each end of said side leg;

at least two lifting straps, each said lifting strap being threaded through said slots in one end of said support channel;

a lifting line being attached to each end of said pair of lifting straps; and said lifting line being attached to a winch, said winch being rotated to hoist said object.

16. The object hoisting system of claim 15, further comprising:

a stabilizer bar being inserted inside of a truck cap at substantially the rear thereof.

17. The object hoisting system of claim 16, further comprising:

a tensioning device being fastened to each support channel adjacent said compression stabilizer bar, wherein said stabilizer bar preventing the truck cap from being damaged.

18. The object hoisting system of claim 15, further comprising:

an S-hook being disposed at each end of said lifting strap, said plurality of S-hooks being retained by a lift ring, said retaining ring being fastened to said lifting line.

19. The object hoisting system of claim 15, further comprising:

a first support bar being attached to a first end of each said support channels, a second support bar being attached to a second end of each said support channels.

20. The object hoisting system of claim 15, further comprising:

at least one pulley being utilized to support said lifting line.

21. The object hoisting system of claim 15, further comprising:

a stabilizer bar being inserted inside of a truck cap at substantially the rear thereof.

22. The modified truck cap hoisting system of claim 15, further comprising:

said lifting strap including a ratchet tensioner, said ratchet tensioner allowing slack to be removed from said lifting strap.

23. A modified truck cap hoisting system comprising:

a truck cap having at least two slots disposed in each side at the bottom edges thereof;

at least two lifting straps, each said lifting strap being threaded through one of said at least two slots in one side of the truck cap;

a lift ring;

a lifting line being fastened to said lift ring;

an S-hook being disposed at each end of said lifting strap, said plurality of S-hooks being retained by said lift ring; and said lifting line being attached to a winch, said winch being rotated to lift said truck cap.

24. The modified truck cap hoisting system of claim 23, further comprising:

each said lifting strap including a ratchet tensioner, said ratchet tensioner allowing slack to be removed from said lifting strap.

25. The modified truck cap hoisting system of claim 23, further comprising:

a stabilizer bar being inserted into the truck cap at substantially a rear thereof.

26. An object hoisting system comprising:

at least two support channels, each said support channel having at least one slot disposed on each end thereof;

a first support bar being attached to a first end of each said support channels, a second support bar being attached to a second end of each said support channels;

at least two lifting straps, each said lifting strap being threaded through a slot in one end of said support channel;

a lifting line being attached to each end of said pair of lifting straps; and said lifting line being attached to a winch, said winch being rotated to hoist said object.

27. The object hoisting system of claim 26, further comprising:

each said support channel having a bottom leg and a side leg, a lengthwise slot being disposed in each end of said bottom leg, an angled slot being disposed in each end of said side leg.

28. The modified truck cap hoisting system of claim 26, further comprising:

each said lifting strap including a ratchet tensioner, said ratchet tensioner allowing slack to be removed from said lifting strap.

29. An object hoisting system comprising:

at least two support channels, each said support channel having at least one slot disposed on each end thereof;

at least two lifting straps, each lifting strap being threaded through a slot in one end of said support channel;

a compression stabilizer bar being inserted inside of a truck cap at substantially a rear thereof;

a lifting line being attached to each end of said at least two lifting straps; and said lifting line being attached to a winch, said winch being rotated to hoist said object.

30. The object hoisting system of claim 29, further comprising:

a tensioning device being fastened to each support channel adjacent said compression stabilizer bar, wherein said stabilizer bar preventing the truck cap from being damaged.

31. The object hoisting system of claim 29, further comprising:

each said support channel having a bottom leg and a side leg, a lengthwise slot being disposed in each end of said bottom leg, an angled slot being disposed in each end of said side leg.

32. The modified truck cap hoisting system of claim 29, further comprising:

each said lifting strap including a ratchet tensioner, said ratchet tensioner allowing slack to be removed from said lifting strap.

33. A modified truck cap hoisting system comprising:

a truck cap having at least two slots disposed in each side at the bottom edges thereof;

at least one lifting strap, said lifting strap being threaded through one of said at least two slots in one side of the truck cap;

at least one lifting strap assembly, each said lifting strap including a ratchet tensioner, said ratchet tensioner allowing slack to be removed from said lifting strap, each said lifting strap assembly being threaded through one of said at least two slots in one side of the truck cap;

a lifting line being attached to each end of said at least one lifting strap and at least one lifting strap assembly; and said lifting line being attached to a winch, said winch being rotated to lift the truck cap.

34. The modified truck cap hoisting system of claim 33, further comprising:

a stabilizer bar being inserted into the truck cap at substantially a rear thereof.

35. The modified truck cap hoisting system of claim 33, further comprising:

an S-hook being disposed at each end of said lifting strap, said plurality of S-hooks being retained by a lift ring, said lift ring being fastened to said lifting line.

36. An object hoisting system comprising:

at least two support channels, each said support channel having at least one slot disposed on each end thereof;

at least one lifting strap, each said lifting strap being threaded through one of said slots in each said support channel;

at least one lifting strap assembly, each said lifting strap assembly including a ratchet tensioner, said ratchet tensioner allowing slack to be removed from each said lifting strap assembly, each said lifting strap assembly being threaded through one of said slots in each support channel;

a lifting line being attached to each end of said at least one lifting strap and at least one lifting strap assembly; and said lifting line being attached to a winch, said winch being rotated to hoist said object.

37. The modified truck cap hoisting system of claim 36, further comprising:

a stabilizer bar being inserted into a truck cap at substantially a rear thereof.

38. The modified truck cap hoisting system of claim 36, further comprising:

an S-hook being disposed at each end of said lifting strap, said plurality of S-hooks being retained by a lift ring, said lift ring being fastened to said lifting line.

* * * * *